KENNETH R. DETTWEILER
BASIL J. RYDER
INVENTORS

BY William S. Thompson

AGENT

United States Patent Office 3,234,730
Patented Feb. 15, 1966

3,234,730
DUAL AFTERBURNER MANIFOLD PROPORTIONING CONTROL
Kenneth R. Dettweiler and Basil J. Ryder, South Bend, Ind., assignors to The Bendix Corporation, a corporation of Delaware
Filed Apr. 21, 1959, Ser. No. 807,826
5 Claims. (Cl. 60—35.6)

The present invention relates to a manifold flow control and more particularly to a control for use with a gas turbine engine having a plurality of afterburner manifolds for apportioning the fuel metered by an afterburner control between the manifolds.

It is an object of the present invention to provide manifold flow control apparatus operative to apportion metered fuel flow between a plurality of fuel manifolds.

It is another object of the present invention to provide manifold flow control apparatus to prevent loss of substantial combustion efficiency when fuel is supplied to additional manifolds.

It is another object of the present invention to provide manifold flow control apparatus for dividing fuel being supplied to an engine having a compressor whereby the division of flow is responsive to a pressure generated by the compressor.

Other objects and advantages of our manifold flow control will become apparent from the following specification and the accompanying drawings, in which.

Figure 1:
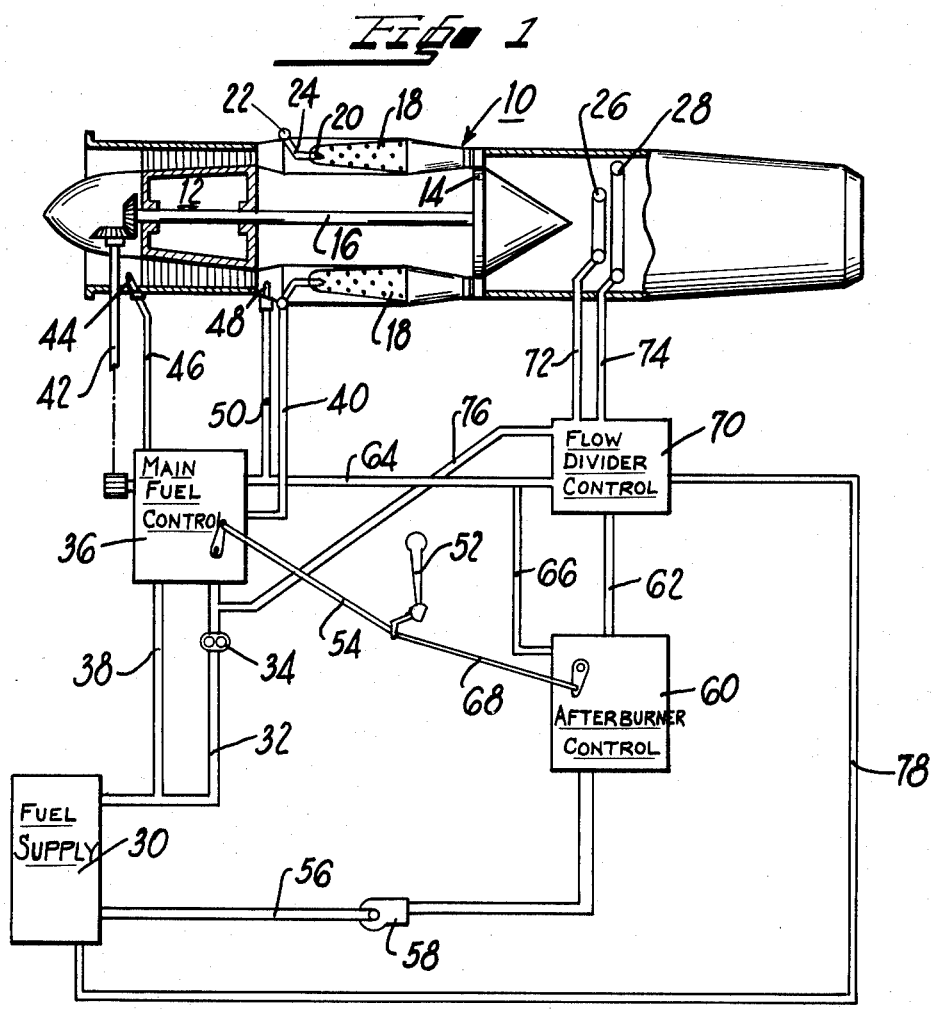
FIGURE 1 shows diagrammatically a gas turbine engine and fuel supply system with which our manifold flow control is a part.

Referring specifically to FIGURE 1, there is shown a gas turbine engine generally indicated by numeral 10 including a compressor 12, a turbine 14 and a drive shaft 16 connected between said compressor and said turbine. A plurality of combustion chambers 18 are provided, with each combustion chamber including a fuel nozzle 20 which is supplied fuel from a common manifold 22 through individual fuel lines 24. The engine further includes a first afterburner manifold 26 which will hereinafter be referred to as the "core" manifold and a second manifold 28 which will be referred to as the "annular" manifold.

A fuel supply system is operative with engine 10 and includes a fuel supply 30 which supplies fuel to the plurality of combustion chambers 18 by way of conduit 32 which includes high pressure pump 34, main fuel control 36 which meters the fuel and returns any excess to conduit 32 through conduit 38, and an outlet conduit 40 connected to the previously mentioned common manifold 22. Main fuel control 36 meters fuel in response to the speed of engine turbine 14 as sensed through the mechanical connection 42, inlet air temperature as sensed by probe 44 and transmitted through conduit 46, a compressor generated air pressure sensed by probe 48 and transmitted through conduit 50, and the position of a manually positionable control member 52 as transmitted by the linkage 54. The method by which the main control 36 combines the aforementioned input parameters and thereby meters the flow of fuel may be in accordance with the teachings of copending application Serial No. 499,432, filed April 5, 1955 in the name of H. J. Williams, B. J. Ryder and F. R. Rogers and is assigned to the same assignee as is the present application.

Fuel supply 30 supplies additional fuel through conduit 56 which includes high pressure centrifugal supply pump 58 to the afterburner fuel control 60 which is operative to meter fuel passing therethrough to the outlet conduit 62. The metering function of afterburner control 60 is in response to compressor generated air pressure of engine 10 as sensed by probe 48 and transmitted through conduits 50, 64 and 66 and the position of manually positionable control member 52 transmitted by linkage 68. The method by which the afterburner control 60 combines the input parameters and thereby meters the fuel may be in accordance with the teachings of copending application Serial No. 520,722, filed July 8, 1955 in the name of Howard J. Williams, and assigned to the same assignee as is the present application, now Patent No. 3,007,303, issued November 7, 1961.

Metered fuel from afterburner control 60 which is contained in conduit 62 is transmitted to our manifold flow control 70 whereby the fuel is apportioned between a first conduit 72 which delivers fuel to the core manifold 26 and a second conduit 74 which delivers fuel to the annular manifold 28. The dividing function of control 70 is in response to the flow of fuel delivered by conduit 62 and compressor generated air pressure transmitted through the conduit 64 as will presently be described in detail. A supply of high pressure servo control fluid is transmitted to the manifold flow control 70 from the outlet of pump 34 by conduit 76. Low pressure drain fluid is returned from the manifold flow control to fuel supply 30 by way of conduit 78.

Figure 2:
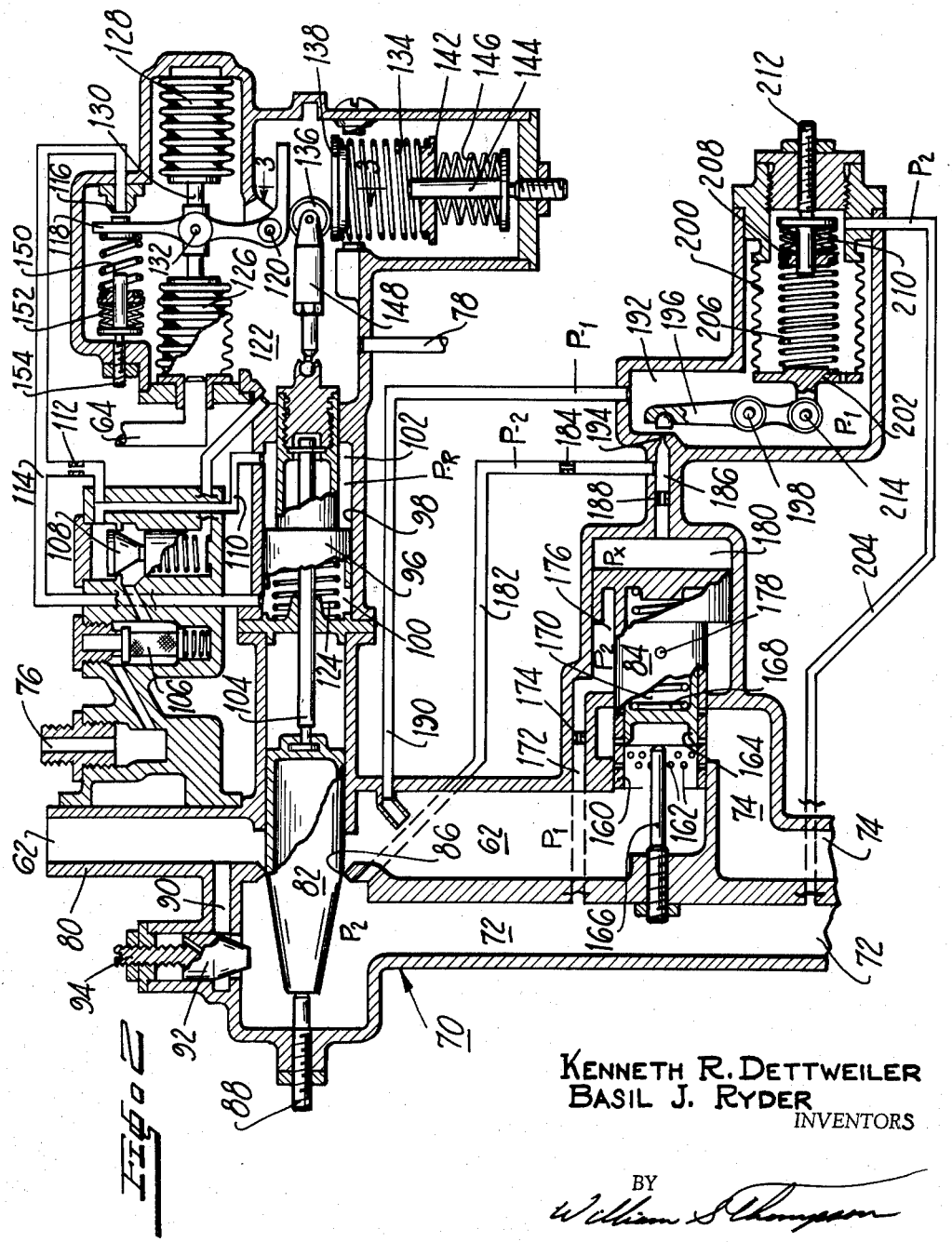
FIGURE 2 is a sectional view of a manifold flow control embodying the novel features of the present invention.

In FIGURE 2 there is shown in greater detail a sectioned view of the manifold flow control of the instant invention having a housing 80 which forms an inlet conduit 62 containing $P_1$ pressure metered fuel from the afterburner control 60, shown in FIGURE 1, and two outlet conduits 72 and 74 which transmit fuel to core manifold 26 and annular manifold 28 respectively. A first control valve 82 is operative with an orifice 86 formed by an inner wall of housing 80 to provide a variable sized orifice for permitting the passage of fuel from conduit 62 to conduit 72. Control valve 82 is contoured such that an increasing larger area is formed to permit the passage of fuel as the valve is moved to the right. A relatively small amount of fuel is permitted to by-pass valve 82 by means of a parallel flow path provided by conduit 90 and valve 92. Valve 92 is externally adjustable by means of a threaded stem 94 to provide an external calibration adjustment the effect of which will be considered hereafter. The extreme leftward or minimum area position of control valve 82 is defined by a mechanical stop member 88 which is threadedly secured to the housing 80 to provide for ready adjustment. Due to the restrictive action of valves 82 and 92 the pressure of fuel in conduit 72 is less than that in conduit 62 and is designated as $P_2$ pressure fuel. The $P_1$–$P_2$ pressure differential existing between conduits 62 and 72 is a direct function of fuel being passed past valves 82 and 92 and an inverse function of the combined fluid permitting areas provided by said valves. This pressure differential may be readily varied by controlling the axial position of the contoured valve 82. A differential area piston 96 is slideable in a cylinder 98 and forms first and second chambers 100 and 102 therewith. Piston 96 is directly connected to control valve 82 by means of connecting rod 104 such that any movement of said piston is operative to position the control valve. Control fluid from the outlet of high pressure pump 34 (FIGURE 1) is transmitted to the manifold flow control 70 by conduit 76 (FIGURE 2) and through a fuel filter of the relieving type 106, a constant pressure regulator valve 108, and conduit 110 to the chamber 102 where it is operative to exert a fluid pressure force against the smaller side of differential area piston 96 tending to urge it to the left. A control fluid susceptible to being varied in pressure is supplied to chamber 100 from regulator valve 108 through restrictive bleed member 112 and conduit 114 where it is operative to exert a second fluid pressure force acting on the larger area of piston 96 tending to urge it to the right. Conduit 114 includes a variable servo control orifice defined by servo valve seat 116 and movable lever 118 rotatably mounted about supporting shaft 120 which is secured to a projection of control housing 80. Lever 118 is located in a chamber identified by numeral 122 which contains low pressure pump inlet fuel which is returned to fuel supply 30 by means of conduit 78. The principal source of said low pressure fuel is derived from leakage through servo orifice 116. As lever 118 moves clockwise about shaft 120 it is operative to close the opening provided by servo valve seat 116 and permit the pressure of fluid in conduit 114, and thus also in the chamber 100, to increase and approach in value the outlet pressure of servo regulator valve 108 which is designated $P_R$ pressure. In this instance the pressures in chambers 100 and 102 acting on differential piston 96 are substantially equal, but due to the larger area of piston 96 exposed to fluid pressure in chamber 100 the net force acting on said piston will tend to move it and valve 82 to the right. If lever 118 should be moved counterclockwise about shaft 120 a maximum amount to provide unobstructed flow of control fluid from servo valve seat 116 to the low pressure reservoir provided by chamber 122, the pressure of fluid in conduit 114 will decrease. By designing a proper relationship in size between restrictive bleed 112, through which high pressure fluid is supplied to conduit 114, and servo seat 116, through which fuel is expelled from conduit 114, the pressure of fluid in conduit 114 may approach in value the pressure of low pressure fluid in chamber 122. When the pressure of fluid in chamber 100 substantially approaches low pressure pump inlet pressure, it produces a fluid pressure force acting on piston 96 less than that produced by $P_R$ fluid in chamber 102, and the net force acting on piston 96 tends to move it and control valve 82 to the left. Positioning lever 118 intermediate to the two extremes above described will establish varying values of pressure in conduit 114 and chamber 100. At one intermediate position of lever 118 the pressure in chamber 100 will produce a fluid pressure force acting on piston 96 just sufficient to balance out all other forces acting on said piston. This position may be identified as the "null" position whereby the forces on piston 96 are in balance and no movement results. Movement of lever 118 counterclockwise from the "null" point will cause piston 96 to move to the left and clockwise movement will cause said piston to move to the right. Inasmuch as the pressure level of fuel in conduit 114 differs by progressively larger amounts from the value it has at "null" position as lever 118 is progressively moved away from its "null" position, the force differential on piston 96 will also become progressively larger causing said piston to move at a rate dependent on the departure of lever 118 from its "null" position. Thus the direction and rate of movement of piston 96 and control valve 82 are controlled by the direction and degree of departure of lever 118 from its "null" position. Chamber 100 includes a relatively light compression spring 124 which is operative to urge piston 96 to the right and control valve 82 in an open position under shut-down conditions and yet is light enough so as not to significantly affect the operation of servo piston 96 when control fluid is applied.

Movement of lever 118 in either direction about support shaft 120 is occasioned by an unbalance of force moments acting on said lever. A pair of oppositely arranged bellows 126 and 128 are contained in chamber 122 having their movable ends interconnected by a rod 130. Bellows 128, as illustrated in FIGURE 2, is evacuated and sealed so as to contain an interior reference pressure of substantially zero absolute pressure. It should be understood, however, that if desired bellows 128 may be readily vented to atmospheric pressure to provide an ambient air reference pressure. Bellows 126 communicates interiorly with a compressor generated air pressure from the compressor 12 of the engine 10 by means of conduit 64. Any force acting on bellows 126 and 128 due to the pressure of low pressure pump inlet fluid in chamber 122 is effectively cancelled out due to the fact that said bellows are designed to each have the same effective area so that equal and oppositely acting forces are applied to the rod 130 which balance each other out. Rod 130 is connected by pin 132 to lever 118 such that the sum of the forces acting on the bellows is applied to said lever a fixed spaced distance from support shaft 120; said sum of forces being a direct function of the difference between compressor pressure in bellows 126 and the reference pressure in bellows 128. The moment acting on lever 118 due to the force applied by bellows 126 and 128 acting a spaced fixed distance from support shaft 120 is opposed by a second moment produced by the force of a spring 134 transmitted through roller 136 and table member 138. Table member 138 is supported pivotably along one edge by shaft 140 and retains the upper end of spring 134. The lower end of spring 134 is contained by retainer 142 which is centrally aligned by rod 144. A number of dished temperature responsive bimetallic disc members 146 are stacked along rod 144 and are operative to reposition retainer 142 in response to changes in fuel temperature so that any load change of spring 134 due to the temperature of surrounding fuel is compensated by changing the length of spring 134 and varying its compressive load in a direction to nullify errors due to temperature variations. Thus the load applied by spring 134 to lever 118 remains constant irrespective of fuel temperature changes. Rod 144 has an end which threadedly engages housing 80 to provide a fixed support for spring 134 and extends externally so as to be readily adjustable during control calibration. Roller 136 which is operative to transmit the constant force produced by spring 134 to lever 118 is connected by means of rod 148 to piston 96 and is therefore operative to vary the point at which the constant spring force is applied to lever 118 as a function of the position of piston 96 and the control valve 82. By varying the point of force application, roller 136 is operative to vary the moment which acts on lever 118 which moment opposes that induced by bellows 126 and 128. Means comprising spring 150, temperature discs 152, and externally adjustable rod 154 are operative to apply a force to the upper end of lever 118 for the duo purpose of nullifying any force unbalance on lever 118 due to the impact of impinging fuel flowing from conduit 114 and for providing an external trim adjustment for insuring the correct force balance on lever 118.

The flow divider control of the instant invention includes a second control valve 84 operative to control the passage of fuel between conduits 62 and 74 to annular manifold 28. Control valve 84 includes a first axially movable member 160 having a pattern of holes 162 which are operative with a cylindrical bore in housing 80 to provide a variable area for permitting the flow of fuel as a function of the axial position of member 160. Valve 84 further includes a second axially movable member 164 which has an edge operative with the pattern of holes 162 to further vary the effective flow permitting area as a function of the axial movement of member 164. A mechanical stop member 166 is threadedly secured to an inner wall of housing 80 and is aligned to limit movement of valve member 164 in a leftward direction. The following forces act on second valve member 164 to control its axial position: first, the force due to $P_1$ pressure fluid in conduit 62 which tends to urge said valve member to the right; second, the force produced by spring 168 contained in chamber 170 which is formed by the hollow interiors of valve members 160 and 164 and acts on member 164 urging it to the left; and third, a $P_2$ pressure force resulting from $P_2$ pressure fluid contained in chamber 170 and acting on valve member 164 tending to urge it to the left. $P_2$ pressure fluid is transmitted to chamber 170 from conduit 72 downstream of first control valve 82 by means of conduit 172, restrictive damping bleed 174, annular chamber 176, and a series of ports 178 arranged circumferentially around first valve member 160. First control valve member 160 is urged to the right by a combination of forces including $P_2$ pressure fluid contained in annular chamber 176, $P_2$ fluid contained in interior chamber 170, and the reaction force resulting from spring 168 also contained in interior chamber 170. The aforementioned forces act on an enlarged piston like element formed on the right end of control valve member 160. Control valve member 160 further forms a chamber 180 with a housing 80 which is supplied fuel from two sources: first, $P_2$ pressure fluid from conduit 72 is supplied through conduit 182, restrictive bleed 184, conduit 186, and damping bleed 188; and second, $P_1$ fluid from conduit 62 transmitted through conduit 190, chamber 192, a variable orifice formed by fixed restrictive orifice 194 and movable lever 196, conduit 186, and restrictive damping bleed 188. Movable lever 196 is pivoted about support shaft 198 and is operative to control the varying quantities of either $P_1$ or $P_2$ fluid supplied to chamber 180. For example, should lever 196 rotate counterclockwise and close the restriction 194, the supply of $P_1$ pressure fluid to chamber 180 will be cut off allowing the pressure in said chamber to approach $P_2$ pressure in value. If on the other hand, lever 196 should be rotated clockwise an extreme amount to permit a maximum amount of $P_1$ fluid to flow through restriction 194, the fluid pressure in chamber 180 will approach $P_1$ pressure in value. At an intermediate position of lever 196 the pressure of fluid in chamber 180 will be just sufficient to balance out all forces tending to move control valve member 160. The intermediate position may be termed the "null" position for lever 196 and any movement counterclockwise will tend to decrease the fluid pressure in chamber 180 causing control valve 160 to move to the right and any clockwise movement from the "null" position will cause the pressure in chamber 180 to increase and move control valve member 160 to the left. A bellows 200 is contained in chamber 192 and includes an end plate 202 which is movable in response to the fluid pressure forces acting on said bellows. $P_1$ pressure fluid in chamber 192 acts exteriorly on bellows 200 tending to compress said bellows and move the end plate 202 to the right. Conduit 204 is operative to transmit $P_2$ pressure fluid from conduit 72 to the interior of bellows 200 producing a force acting on said bellows tending to move the end plate 202 to the left. A spring 206 is contained in the interior of bellows 200 to produce a reference force acting on the end plate 202 and is contained on one end by movable retainer 208 which is controlled in response to the temperature compensating discs 210. Retainer 208 and disc 210 are aligned and held in position by fixedly secured rod 212 which is externally adjustable for calibration purposes. Temperature compensating discs 210 are operative to correct the height of spring 206 to prevent spring load variations due to varying temperatures of the surrounding fuel. The temperature discs 210 have the further function of varying the reference load applied by spring 206 in a predetermined manner to compensate for fuel metering variations in control valve 84 due to changes in specific gravity of the fuel. The movable end plate 202 of bellows 200 is connected to movable lever 196 by the pin connection 214. When lever 196 is in its null position the $P_1-P_2$ pressure differential acting across bellows 200 is just sufficient to balance out the reference force supplied by spring 206. If the $P_1-P_2$ pressure differential should vary from its reference value the movable end plate 202 will rotate lever 196 and reposition the first control valve member 160 of the valve 84 in a correcting direction. Considering valve 84 as a whole, it is comprised of a second movable valve member 164 which is operative to pass fuel from conduit 62 to 74 so that the $P_1-P_2$ pressure differential across the first control valve 82 is maintained substantially constant. However, the operation of second valve member 164 is deficient in two respects: first, as it moves to allow passage of varying quantities of fuel it tends to compress or elongate spring 168 and vary its reference force; and second, as the fuel passes through the restricted openings provided by hole pattern 162 the increased velocity of fluid tends to create a force unbalance across the member 164. These deficiencies are corrected by providing a first control valve member 160 which compares a desired pressure differential supplied by spring 206 against an actual pressure differential supplied by conduits 190 and 204, and to reposition itself in a correcting direction in response to any error between a desired and actual pressure differential across the first control valve 82.

Figure 3:
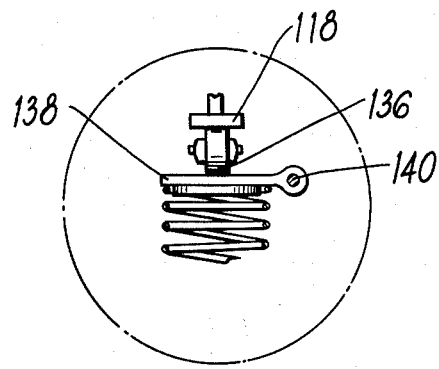
FIGURE 3 is a sectional view of a portion of the manifold flow control shown in FIGURE 2 taken along section 3—3.

FIGURE 3 is a view taken along section 3—3 of FIGURE 2 to more clearly illustrate the relationship between the pivotable support 140 and the table element 138. It should be noted by this arrangement that rotation of table element 138 will not obstruct the transverse movement of roller 136.

Figure 4:
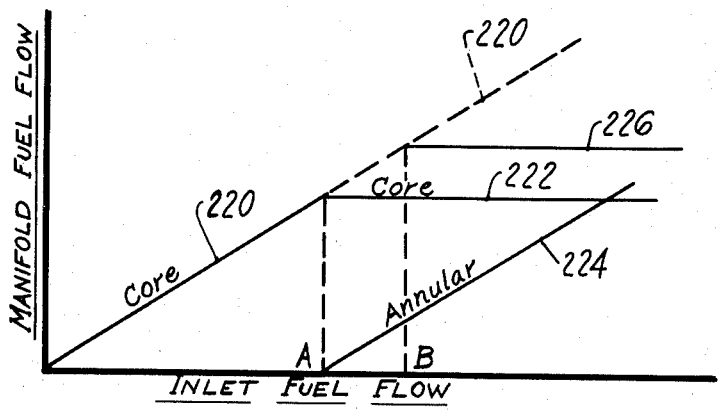
FIGURE 4 is a curve showing some of the operating characteristics of the present invention.

In FIGURE 4 there is shown a graph showing some of the operating characteristics of the present invention wherein the inlet fuel flow supplied by conduit 62 is plotted along the abscissa and manifold fuel flow supplied by the conduit 72 and 74 to the core and annular manifolds 26 and 28 respectively is plotted along the ordinate. Curve 220 illustrates the total flow being supplied by conduit 62 all of which is supplied to the core manifold 26 until the point A along the abscissa is reached. At the point A our flow divider control is operative to supply fuel to the core manifold in accordance with the curve 222 and to the annular manifold in accordance with the curve 224. The point of flow division A may be varied in the instant invention such as represented by the point B in the manner to be hereafter described to produce a fuel supply to core manifold 26 in accordance with the curve 226.

*Operation*

The operation of the present invention can best be described by means of a typical cycle of operation to describe adequately the interrelationship of the parts. Assuming first that no fuel is supplied by the afterburner control 60 to the conduit 62 and our flow divider control, and that the engine 10 is shut down, the first control valve 82 will be urged in a wide open position by operation of spring 124 while second control valve 84 will be in a closed direction by operation of spring 168 acting against the second valve member 164. As engine 10 is brought up to speed below the afterburning range of operation the compressor 12 of said engine is operative to supply a compressor generated pressure by means of conduits 50 and 64 to the bellows 126 of the flow divider control 70. Also high pressure control fluid is transmitted by conduit 76 to manifold flow control 70 wherein it is operative to control the position of piston 96 and first control valve 82 at a position determined by compressor pressure in bellows 126. Thus control valve 82 assumes an intermediate position responsive to the pressure generated by compressor 12 and second control valve 84 has remained closed. Throttle 52, shown in FIGURE 1, is advanced into the afterburning range of operation such that fuel is metered by the afterburner control 60 and supplied to the conduit 62, fuel will flow past the partially opened first control valve 82 into the conduit 72 to the core manifold 26 of the engine 10. The $P_1$—$P_2$ pressure differential across control valve 82 for an initial low rate of fuel flow will be insufficient to act on the second control member 164 of the second valve 84 to move it in an opening position such that no fuel flow would be supplied through the conduit 74 to the annular manifold 28. As throttle 52 is progressively advanced such that the fuel delivered by afterburner control 60 to conduit 62 is progressively increased, the fuel supplied past first control valve 82 to conduit 72 will also progressively increase in accordance with a curve 220, shown in FIGURE 4, to the left of the point A causing an increasingly greater $P_1$—$P_2$ pressure differential to develop across valve 82. At the point A of FIGURE 4 the $P_1$—$P_2$ pressure differential has increased sufficiently to begin opening second control valve member 164 and to permit passage of fuel to the annular manifold 28 in accordance with the curve 224. Further increases in afterburner metered fuel to conduit 62 would tend to increase the $P_1$—$P_2$ pressure differential across first control valve 82, but inasmuch as second control valve 84 is responsive to $P_1$—$P_2$ pressure differential it will open further until the $P_1$—$P_2$ pressure differential has returned to a predetermined value. Thus once the second control valve 84 becomes operative the pressure differential across first control valve 82 remains constant.

If during flight conditions of engine 10, the pressure generated by compressor 12 and sensed by bellows 126 should change, as for example would occur if the flight altitude of the engine changed, bellows 126 would be operative to vary the force acting on lever 118 at the pin connection 132. Assuming this change is in a direction for increasing compressor generated pressure and increasing the force acting on lever 118, the moment acting clockwise on said leved would tend to rotate it about support shaft 120 and restrict the opening provided by servo valve seat 116 so that fluid pressure in conduit 114 and chamber 100 acting on piston 96 would increase. In response to the increased fluid pressure in chamber 100 piston 96 and first control valve 82 would move to the right which would also displace roller 136 to the right which would increase the moment acting counterclockwise on lever 118 tending to restore it to its original "null" position. The resultant effect would be to have first control valve 82 repositioned to a further open position which has the effect of decreasing $P_1$—$P_2$ pressure differential across said valve. Therefore, the amount of fluid flow past valve 82 necessary to establish the $P_1$—$P_2$ pressure differential sufficient to operate second control valve 84 would increase thus providing a new point of flow division as represented by the point B of FIGURE 4. The means for combining an input force from bellows 126 and a feedback force from spring 134 comprised of lever 118 and roller 136 has the advantage of providing linear changes in the position of valve 82 for a given change of pressure within bellows 126. This linearity results in the fact that the moment balance about lever 118 is a linear or first order equation in which a variable input force must be balanced out by a change in the length of the moment arm of a balancing force.

An externally adjustable valve 92 has been provided to provide a degree of adjustment for calibration purposes of the flow permitting area between conduits 62 and 72 for a given pressure input to bellows 126. For example, a selected compressor pressure input in bellows 126 will cause control valve 82 to assume a position in response thereto. If this position of valve 82 offered less than a desired amount of flow permitting area, the $P_1$—$P_2$ pressure differential would be higher than desired causing second control valve 84 to start opening sooner than desired. This condition could be easily corrected by externally adjusting the stem 94 of the valve 92 to increase the flow of fluid by-passed around the first control valve 82 until the desred opening point of second control valve 84 were obtained for a given selected compressor pressure input.

The embodiment of the present invention illustrated and described is to be considered as one representative means for carrying out the teachings of the present invention, it will be apparent to those skilled in the art that the various changes in the structure and relative arrangement of parts may be made to suit individual requirements without departing from the spirit and scope of the present invention.

We claim:

1. A flow divider control for use with a gas turbine engine having a compressor, a supply of high pressure metered fuel, and first and second afterburner manifolds comprising: a conduit arrangement having an opening into which metered fuel is introduced and first and second branches adapted to deliver complementary portions of said metered fuel to said first and second manifolds respectively; first and second valve means disposed in said first and second branches respectively to control flow division; means responsive to a pressure generated by the engine compressor connected to said first valve means to control the position thereof such that the pressure drop thereacross is a combined function of the portion of metered flow delivered to said first manifold and said compressor generated pressure; and sensing means responsive to a pressure drop across said first valve means operative to maintain said second valve means in a closed position when said pressure drop is less than a predetermined quantity; said sensing means further operative to regulate said second valve means in an open position when said pressure drop substantially equals the predetermined quantity and permit varying portions of said metered fuel to flow through said second branch sufficient to maintain said pressure drop across said first valve means substantially constant while said pressure is controlling the position of said first valve.

2. A flow divider control for use with a gas turbine engine having a compressor, a supply of high pressure metered fuel, and first and second afterburner manifolds comprising: a conduit arrangement having an opening into which metered fuel is introduced and first and second branches adapted to deliver complementary portions of said metered fuel to said first and second manifolds respectively; a valve member disposed in said first branch for producing a pressure differential thereacross; head regulating valve means disposed in said second branch operative to limit the pressure differential across said valve member from substantially exceeding a predetermined value by diverting varying quantities of metered fuel through said second branch; and means responsive to a pressure generated by the engine compressor connected to said valve member to control the position thereof and thereby vary the flow through said first branch at which the predetermined value of said pressure differential is attained.

3. A flow divider control as claimed in claim 2 wherein said head regulating valve means includes control means receiving a reference spring for producing a force representative of the predetermined value of said pressure differential and fluid pressure responsive means producing a force representative of the actual value of said pressure differential.

4. A flow divider control for use with a gas turbine engine having a compressor, a supply of high pressure metered fuel, and first and second afterburner manifolds comprising: a conduit arrangement having an opening into which metered fuel is introduced; said conduit further including first and second branch passages adapted to deliver complementary portions of said metered fuel to said first and second manifolds respectively; a valve member arranged in said first passage to establish a pressure drop thereacross that varies as a direct function of the fuel flow therethrough; normally closed valve means operative with said second passage to prevent flow therethrough when in a closed position; head sensing means connected to said normally closed valve means to initiate opening movement thereof when the pressure drop across and flow through said valve member attain a predetermined value; and control means responsive to a pressure generated by said compressor operative to position said valve member and vary the fuel flow pressure drop relationship within said first passage and thereby vary the predetermined value of fuel flow required to initiate opening movement of said normally closed valve means.

5. A flow divider control as claimed in claim 4 where said head sensing means is further operative to regulate the position of said normally closed valve means after opening movement has been initiated to maintain the pressure drop across said valve member at a substantially constant value while said pressure is controlling the position of said valve member.

References Cited by the Examiner
UNITED STATES PATENTS

| | | | |
|---|---|---|---|
| 2,127,172 | 8/1938 | Hermitte | 60—39.28 |
| 2,590,853 | 4/1952 | Fulton | 60—39.28 |
| 2,683,349 | 7/1954 | Lawrence | 60—39.28 X |
| 2,712,219 | 7/1955 | Warne | 60—39.28 |
| 2,724,239 | 11/1955 | Fox | 60—39.28 |
| 2,757,511 | 8/1956 | Jagger | 60—39.28 |
| 2,764,868 | 10/1956 | Watson et al. | 60—39.28 |
| 2,770,945 | 11/1956 | Crim. | |
| 2,843,141 | 7/1958 | Arnot et al. | 137—115 |
| 2,916,876 | 12/1959 | Colley et al. | 60—39.28 |
| 3,007,303 | 11/1961 | Williams | 60—35.6 |

JULIUS E. WEST, *Primary Examiner.*

SAMUEL LEVINE, *Examiner.*